June 29, 1965  J. DAUGHERTY  3,191,294
IN-PROCESS INSPECTION APPARATUS
Original Filed June 26, 1962  3 Sheets-Sheet 1
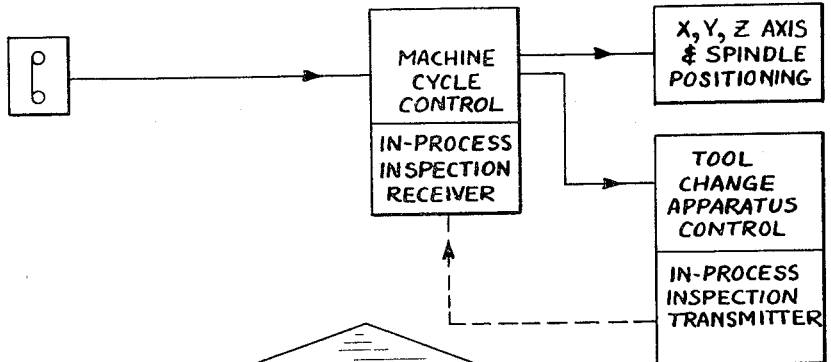
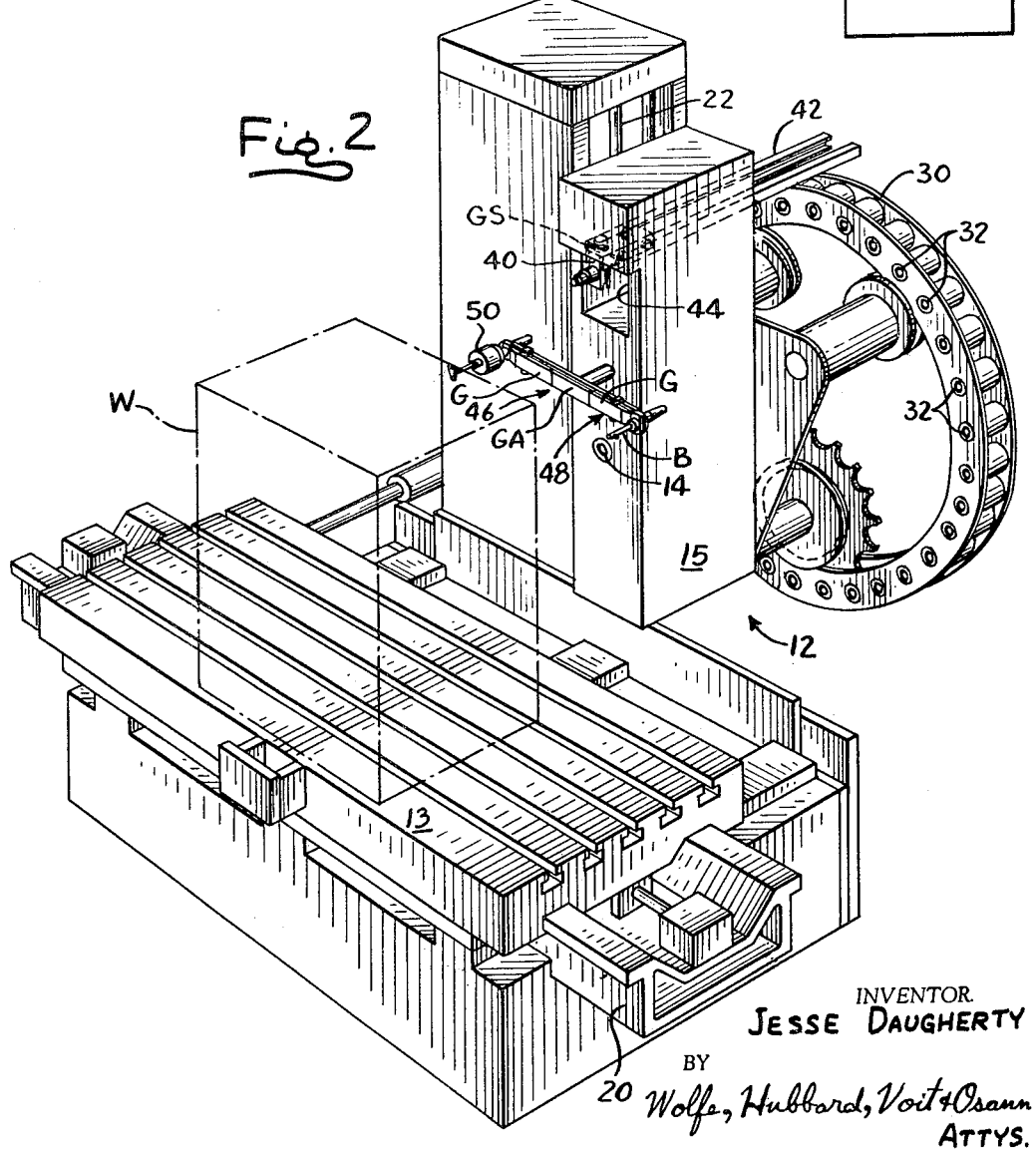
INVENTOR.
JESSE DAUGHERTY
BY
Wolfe, Hubbard, Voit & Osann
ATTYS.

June 29, 1965
J. DAUGHERTY
3,191,294
IN-PROCESS INSPECTION APPARATUS
Original Filed June 26, 1962
3 Sheets-Sheet 3
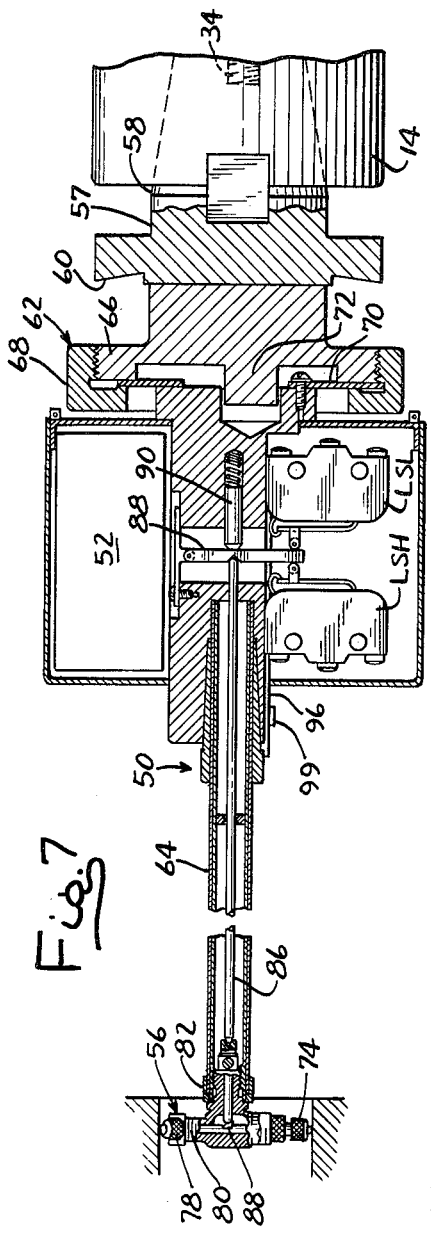
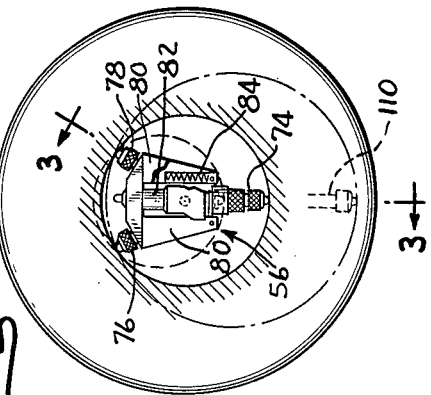
INVENTOR.
JESSE DAUGHERTY
BY
*Wolfe, Hubbard, Voit & Osann*
ATTYS.

3,191,294
IN-PROCESS INSPECTION APPARATUS
Jesse Daugherty, 142 Doty St., Fond du Lac, Wis.
Continuation of application Ser. No. 205,381, June 26, 1962. This application Feb. 3, 1965, Ser. No. 431,774
8 Claims. (Cl. 29—568)

This application is a continuation of my copending application Serial No. 205,381, filed June 26, 1962, entitled In-Process Inspection Apparatus.

This invention relates to machining processes and more particularly to in-process inspection of machined workpieces.

One of the objects of the present invention is to provide in-process dimensional inspection of machined workpieces as a step in a programmed machining process. In-process inspection of the present invention is particularly suited to machining processes carried out with numerically controlled machine tools, more particularly with such machine tools having mechanism for tool changing.

Another object is to provide workpiece measuring devices for such in-process inspection and adapted for use in connection with automatic tool changing mechanism of a machine tool. A related object is to provide for modifying or overriding the program of the machine tool responsive to the data derived from the measuring device during the inspection step.

Another object is to provide such a measuring device with means for transmitting data as to the gaged measurements, and further to provide for modifying or overriding the machining program responsive to data transmissions.

Other objects will appear from the following description taken in connection with the accompanying drawings, wherein:

FIGURE 1 is a block diagram illustrating an in-process inspection system incorporated in a machine tool control system of the type used for operating a machine tool equipped with automatic tool changing;

FIG. 2 is a perspective view of a machine tool with tool changing mechanism for transferring tool elements and gage devices to and from the machine tool spindle;

FIG. 7 is a longitudinal sectional view of a gage device for in-process inspection;

FIG. 8 is a fragmentary plan view of the gage device shown in FIG. 7;

FIG. 9 is a fragmentary view of the adjustment means for the switches of the gage device as taken in the plane indicated by the lines 9—9 in FIG. 8; and FIG. 10 is an end elevation of the gage device shown in FIG. 7.

Figure 3:
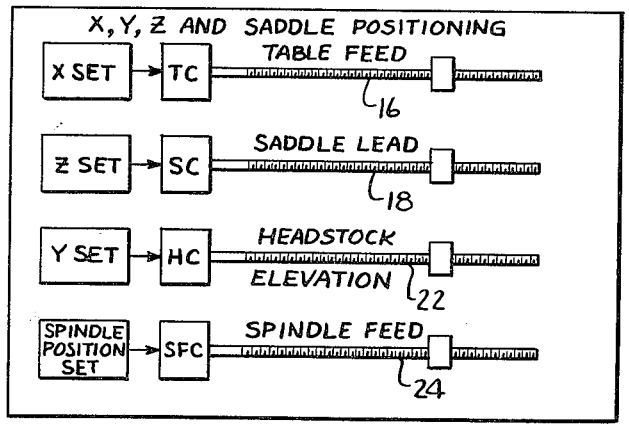
FIGS. 3–6 are schematic views of the blocks in the block diagram of FIG. 1.

While the invention is susceptible of various modifications and alternative constructions, a preferred embodiment has been shown in the drawings and will be described below in detail. It should be understood, however, that there is no intention to limit the invention to the specific form disclosed, but on the contrary, the intention is to cover all modifications and alternative constructions falling within the spirit and scope of the invention as expressed in the appended claims.

General machine organization

Upon more specific reference to the drawings, in-process inspection of a workpiece W is achieved with a machine controlled from a source of programmed data such as a tape and tape reader 10. As shown in the block diagram of FIG. 1, a machine under the control of a machine cycle control circuit is operated to carry out an operating cycle, through X, Y, Z axis and spindle circuits and a tool change apparatus control circuit. Said tool change apparatus circuit also includes an in-process inspection transmitter which is adapted to transmit a signal representing a workpiece dimension to an inspection receiver circuit section of the machine cycle control circuit. Certain blocks of this block diagram are schematically detailed in FIGS. 3–6, to which reference may also be made.

In FIG. 2 it is assumed that the machine being controlled is a form of horizontal spindle boring machine 12 in which power means are provided for relative positioning of the workpiece W carried on a table 13, and the spindle 14 mounted in a headstock 15. The machine tool 12 is also equipped with tool change apparatus which is under the direction of the machine cycle control system. It will be understood, however, that the invention is applicable to other machine tools, as well as to other machines, such as inspection machines which carry out no cutting operations but are equipped with equivalent mechanism for tool change. "Machine tool" used herein is intended to embrace all such machines.

The workpiece W is movable transversely of the spindle 14 (called the X direction) by the table feed screw 16 (FIG. 3). The feed screw 16 is operated by means of a clutch TC and X setting circuit shown schematically in FIG. 3, preferably in the form of digital input devices including position converters which feed back the position of the feed screw 16 in digital form.

A saddle lead screw 18 is provided to move the workpiece via the table 13 and saddle 20 axially of the spindle, called the Z direction. A headstock elevating screw 22 provides for Y axis control and a feed screw 24 for the spindle 14 will provide for spindle positioning. The feed screws 18, 22, 24 for the saddle 20, spindle 14, and headstock 15 are operated by similar means including clutches SC, HC and SFC controlled from Y and Z setting circuits and a spindle positioning setting circuit shown schematically in FIG. 3.

Figure 4:
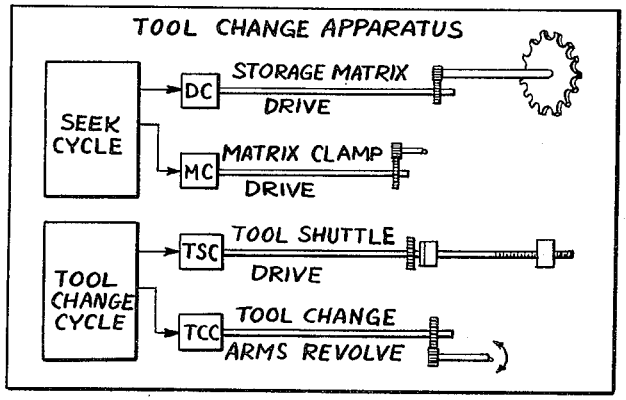

In addition to the foregoing power driven elements of a machine tool, according to the present invention the exemplary machine tool also includes apparatus for automatic tool changing herein shown as including a matrix 30 for storage of a set of tool elements such as a boring tool B which is shown in the process of being transferred to the storage matrix from the spindle 14. Referring to FIG. 4, the tool change apparatus includes a storage matrix drive under the control of a drive clutch DC which is operated by a seek cycle circuit. It is contemplated that the tool change apparatus may be so constituted as to carry out any desired mode of tool search, for example, the tool elements may be randomly disposed in the compartments 32 of the storage matrix 30 and the apparatus provided with power means for rotating the matrix thereby to position a selected tool at the ready station for transfer to the spindle. The matrix also may include means for reading out the identity of the individual tool elements in each compartment 32 as an incident to the rotation of the matrix past reading mechanism carried in association therewith. Details of such an arrangement are shown in the copending application of John C. Hollis, Serial No. 784,550. Alternatively, the individual storage compartments 32 may be identified to receive a particular tool element, so that in the seek cycle the matrix 30 is rotated to place a particular compartment adjacent the tool ready station, to transfer a selected tool element to the spindle of the machine tool. The storage matrix 30 preferably includes in each compartment 32 clamp means for clamping the tool elements for storage under the control of a matrix clamp drive having a clutch MC which is also directed from the seek cycle circuit.

A power operated draw bar or draw bolt mechanism 34 may be provided in the machine tool spindle 14 for locking the tool elements in the spindle. Since such mechanism is conventional it is not detailed herein.

The tool elements are transferred between the spindle and storage matrix by a tool carriage or shuttle 40 which is moved horizontally along a track 42 through a tunnel 44 in the headstock 15 from a tool ready station adjacent the matrix 30 to a tool change station adjacent the spindle. The shuttle 40 is moved, referring to FIG. 4, by means of a tool shuttle drive under the control of a clutch TSC directed from the tool change cycle circuit. The tool change apparatus also includes, as above noted, a pair of tool change arms 46, 48 which are revolvable about a common support to transfer a tool element from the shuttle 40 at the tool change station to a position opposite the spindle, and is operated for this purpose by a tool change drive and clutch TCC included therein, also controlled from the tool change cycle circuit. The tool change arms 46, 48 and the shuttle 40 are provided with relatively movable grippers G which grip the adapter collars to hold the tools during transfer. A solenoid GS actuates the gripping means of the shuttle 40 to release a tool at the tool exchange station while longitudinal movement of a gripping actuator GA actuates both grippers G of the tool change arms. Longitudinal movement of the tool change arms 46, 48 is also provided so that a tool may be completely extracted from the spindle 14 to clear prior to the transfer operation, and so that a tool positioned opposite the spindle by a tool change arm may be moved longitudinally into the spindle socket.

The foregoing mentioned operations of tool search and tool transfer between storage matrix and spindle may be carried out as programmed steps of a machining process under direction from the seek cycle circuit operated by the machine tool control system. After a selected tool has been transferred to the spindle, the machining step programmed for that tool may be carried out.

In-process inspection

In carrying out the present invention, the machine tool 10 is operated to carry out an inspection step following a machining step or series of steps and as a further one of the programmed steps of its operation. Further, in keeping with the invention, a workpiece gage device 50 is provided which is adapted for storage in the tool storage matrix 30 and for transfer to a spindle 14 by the tool change means with which the machine tool is provided. Such gage device 50 when in the spindle may be moved by means of the machine tool power driven components into relationship with the workpiece to carry out the inspection step. Such inspection device, moreover, includes a transmitter 52 which is included in the machine tool control system and, in keeping with the invention, transmits inspection information in the form of a radio signal to a receiver 54 in the control system, which signal is employed to modify or override the programmed cycle.

Such inspection device may take many different forms, and is herein shown in a preferred embodiment of the invention as a gage head 56 for measuring bores combined with a transmitter unit 52 operated by elements of the gage head for transmitting inspection data in the form of a signal to the receiver unit 54 included in the machine tool control system.

Referring to FIGS. 7–10 for further details, it will be seen that the gage device 50 is carried in the storage matrix or in the machine tool spindle by a tool adaptor 57 having a tapered shank 58 and a flange or collar 60 extending from the shank providing gripping surfaces by which the device is held for transfer to and from the spindle by the tool changing mechanism of the machine tool. The transmitter unit 52 is fixed by a coupling device 62 on the forward end of the adaptor 57 while the gage head 56 is carried by a sleeve or tube 64 extending from the transmitter unit 52 so as to reach within a bore in the workpiece on the table. To allow the gage head 56 to wander slightly from the center axis of the device to accommodate misalignment between the spindle and the bore being measured, the coupling device 62 affords a flexible or universal connection between the adaptor and the transmitter unit. For this purpose the adaptor 57 is provided with a forwardly extending boss 66 which has threads to receive a screw threaded coupling collar 68. The transmitter unit 52 is carried by an annular plate 70 of thin flexible metal or like material clamped between the coupling collar 68 and boss 66 to allow a limited degree of universal movement of the gage head 56 whereby the gage head will position itself automatically to enter a bore in the workpiece W should the spindle and bore be imperfectly aligned. The coupling device 62, furthermore, is manually adjustable to initially position the center axis of the gage head. The transmitter unit 52 is loosely fitted on a forward off-center projection 72 so as to be swivelable and may be clamped in a position to which it has been adjusted by the coupling collar.

Referring to FIG. 7, the gage head 56 contacts the bore wall at three points; a fixed contact point is presented by a downwardly extending stem 74, and a pair of movable spaced contact points adjustable to the actual size of the bore are presented by upwardly extending arms 76, 78 carried by an anvil 80. Such anvil 80 is slidably mounted for vertical movement on a body 82 carrying the fixed stem on the sleeve or tube 64 extending from the transmitter 52 and is positionable along with the contact points on the arms 76, 78 carried thereby relative to the fixed stem 74 to fit exactly in the bore and thereby to indicate the measurement of the bore in which the gage head is positioned. The anvil 80 is biased upwardly by means such as a pair of compression springs 84 so that the gage points are normally spread apart to define a circle slightly oversize with relation to the actual size of the bore being measured. The gage head 56 includes means for converting vertical motion of the anvil 80 to horizontal sensing movement of a sensing rod 86 actuating the transmitter 52. Such means for converting motion of the anvil to motion of the rod is in the form of a cam 88 engaging the end of the slidably movable sensing rod 86.

When the gage head 56 is inserted in a bore, rollers defining the three contact points supported by the anvil 80 and body 82 engage the workpiece at the end of the bore, and when the gage points are properly adjusted to be just slightly oversize the anvil 80 is caused to be moved inwardly as an incident to inserting the gage head 56 within the bore so that the three contact points of the gage give an accurate representation of the bore diameter. The cam 88 operated by the anvil 80 engages and moves the sensing rod 86 to a position indicating the actual diameter of the bore.

In general terms, the sensing rod 86 actuates the transmitter unit 52 of the gage device to transmit inspection data to the receiver unit 54 which is incorporated in the machine tool control system. One of the features of the present gage device is the provision of a transmitter unit which emits a radio frequency signal to which the receiver unit may be tuned to respond, thereby eliminating the need for mechanical or electrical connections between the gage device and machine tool control system. In other words, the radio signal is transmitted wirelessly from the transmitter unit in the gage device to the receiver unit in the tool control system. Hence such gage device is particularly suited for use in connection with a machine tool equipped with tool changing apparatus, since the gage device may be removed from a storage matrix, as the machine tool was shown to be equipped in FIG. 2, and transferred to the spindle as one of the steps in the machining process, and then returned to the storage matrix after the inspection step has been completed.

Figure 5:
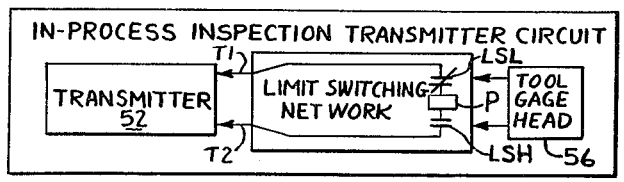

For this purpose, the sensing rod 86 responds to movement of the gage head anvil 80 according to the bore diameter, and such movement of the sensing rod is transmitted to an actuator 88 for a pair of limit switches LSH, LSL which form part of the in-process inspection transmitter circuit (FIG. 5). The actuator 88 for the switches is pivotally mounted at one end in the transmitter unit and is engaged at about its midpoint by the sensing rod 86. A spring biased element 90 urges the sensing rod longitudinally of the sleeve 64 so that in the free condition of the gage head 56, with the anvil 80 at its outermost point, the actuator 88 is moved to the left in FIG. 7 to actuate a high limit switch LSH. Upon movement of the gage head cam means contacting the sensing rod, so as to move the sensing rod to the right in FIG. 7, the limit switch actuator 88 is moved in a direction to de-actuate the high limit switch LSH and actuate the low limit switch LSL. Both limit switches LSL and LSH are adjustable to be actuated at different positions of the actuator 88, in this manner affording high and low tolerance limit adjustment. In the present case, such adjustments are made by means of adjustment screws 92, 94. The limit switches are fixed to brackets 96, 98 which are slidably adjusted within the transmitter unit casing by such adjustment screws 92, 94. Locking screws 99, 100 are provided to fix the brackets at any position of adjustment.

As shown in the block diagram of FIG. 5, the limit switches LSL and LSH of the gage device in the preferred form of the invention are connected in the initial outside tolerance condition of the gage head so that the contacts of the high limit switch LSH are open while the contacts of the low limit switch LSL are closed. As the gage elements are moved inwardly as an incident to moving the gage head 56 within a bore, the contacts of the high limit switch LSH are also closed with the bore diameter smaller than the high tolerance limit; the low limit switch contacts will be opened with the bore undersize. With the bore within tolerance, the contacts of the both switches LSL and LSH will be closed and a source of potential P between such contacts will trigger the transmitter circuit through one or both connections T1, T2. Other switching arrangements may be used to actuate the transmitter responsive to within tolerance and outside tolerance conditions. It is preferred for the present purposes, however, to trigger the transmitter so that the latter emits a radio frequency signal responsive to a within tolerance condition of the dimension being measured. The transmitter may be of any suitable type such as the non-directional Telectron TP 39 portable transmitter which transmits a fixed frequency signal to which a RA 30 receiver of the same manufacturer may be tuned to respond. Other arrangements will be suitable and it is not intended that the invention be limited to a particular form of transmitter or receiver, or a particular mode of transmitting a signal responsive to the measuring device detecting a (1) within tolerance or (2) outside tolerance, condition.

Figure 6:
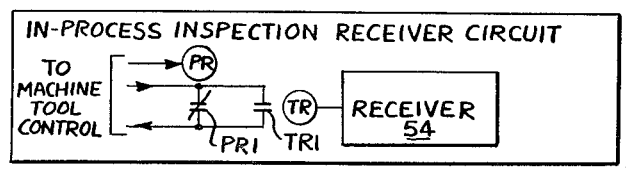

In the present preferred embodiment, a within tolerance condition of a bore energizes the transmitter 52 to produce a signal which is received by the receiver 54 of the receiver circuit section of the machine control system. As shown in FIG. 6, such signal from the receiver actuates a relay TR to close a tolerance relay contact TR1 in the machine control system. For the purpose of coordinating the gage device operation with the operation of the machine tool, a circuit may be used such as shown in FIG. 6 wherein contacts PR1 of a program relay PR are connected in parallel with contacts TR1 of the tolerance relay TR. Upon energizing the program relay PR from the machine tool cycle control circuit, unless the tolerance relay contacts TR1 are closed reflecting an in-tolerance condition, the receiver circuit network continuity will be interrupted. An interruption through the receiver network indicating an outside tolerance condition will trigger the machine tool control system to shut down the tool, operate a trouble light, or otherwise modify the programmed cycle. For this purpose the program relay PR is normally deenergized but energized by the machine control system responsive to direction from the tape reader when the gage device is in position. Where the bore is within tolerance, a tolerance signal via the transmitter and receiver units will close the tolerance relay TR and its contacts TR1 thereby maintaining continuity through the network, and it is contemplated that the programmed operation will thereafter automatically continue.

A further feature of the particular gage device illustrated in FIGS. 7–10 is the capability thereof to receive substitute stems 110 so as to permit measurement of widely different size bores. The individual contact elements 74, 76 and 78 are also finely adjustable. The present invention, however, is not limited to the use of such a gage device and, it is contemplated, may employ various types of inspection devices for measuring hole depths, surface positions, edge positions and other workpiece dimensions. Furthermore, other types of transmitters or means for transmitting inspection data may be employed, such as a transmitter controlled by a variable condenser in place of the limit switches LSL and LSH, operated by a gage sensing rod such that transmitter frequency could be directly indicative of actual bore diameter. In such an arrangement the receiver and in-process inspection receiver circuit could, of course, be constructed to operate in response to variable frequency signals as, for example, by adjusting the machine tool to correct for errors. Other modifications and equivalents for the components illustrated will be obvious to those skilled in the art. Also, it is to be understood that the term "radio signal" as used herein and in the appended claims includes any signal capable of being radiated through the atmosphere, without physical, mechanical or electrical connections, regardless of the particular frequency involved.

I claim as my invention:

1. In a machine tool having a tool support, a workpiece support adjacent said tool support, and power means for relative movement of said workpiece support and said tool support, the combination comprising a plurality of tool elements including a workpiece gage device constructed to be received in said tool support, said workpiece gage device having means for transmitting a measurement representing signal, a storage matrix for said plurality of tool elements mounted adjacent said tool support, tool change means for transferring tool elements between said storage matrix and said tool support, control means for operating said machine tool to carry out an operating cycle including a step whereby said gage device is transferred by said tool change means from said matrix to said tool support for inspection of a workpiece dimension and said gage device and workpiece are moved relatively into contact by said power means, and means included in said control means for receiving a signal from said workpiece gage device designating the workpiece dimensions being measured.

2. The combination in a machine tool having a tool support, a workpiece support, a storage matrix for tool elements adapted to be received in said tool support, tool change means for transferring tool elements between said storage matrix and said tool support, and means for operating said machine tool by controlling said workpiece support and said tool support: of a workpiece gage device constructed to be removably received in said tool support and adapted to be stored in said matrix and to be transferred by said tool change means from said matrix to said tool support for dimensional inspection of a workpiece on said workpiece support, and means in said operating means including a transmitter carried by said workpiece gage device for radiating a measurement representing signal, and a receiver for receiving a signal radiated from said gage device transmitter designating a workpiece dimension being measured for operating said machine tool responsive to said signal.

3. The combination in a machine tool having a tool support, a workpiece support, a storage matrix for tool elements adapted to be received in said tool support, tool change means for transferring tool elements between said storage matrix and said tool support, power means for relative movement of said workpiece support and said tool support, and control means for operating said power means: of a workpiece gage device constructed to be removably received in said tool support and adapted to be stored in said matrix and to be transferred by said tool change means from said matrix to said tool support for dimensional inspection of a workpiece on said workpiece support upon engagement therewith; and means in said control means including a transmitter carried by said workpiece gage device for radiating a measurement representing signal, a receiver mounted remotely from said transmitter for receiving a signal radiated from said gage transmitter designating a workpiece dimension being measured, and means for operating said power means responsive to said signal.

4. The combination in a machine tool having a power driven spindle, a storage matrix for tool elements adapted to be received in said spindle, tool change means for transferring tool elements between said storage matrix and said spindle, and control means for operating said machine tool including said tool change means: of a workpiece gage device adapted to be stored in said matrix and to be transferred by said tool change means from said matrix to said spindle for in-process inspection of a workpiece dimension, transmitter means included in said workpiece gage device for radiating a workpiece measurement representing signal, and means included in said control means for modifying the operation of said machine tool responsive to a signal radiated from said workpiece gage device.

5. The combination in a machine tool having a power driven spindle, a storage matrix for tool elements, tool change means for transferring tool elements between said storage matrix and said spindle, and control means for operating said machine tool including said tool change means: of a workpiece gage device adapted to be stored in said matrix and to be transferred by said tool change means from said matrix to said spindle for in-process inspection of a workpiece dimension, transmitter means included in said workpiece gage device for radiating a workpiece measurement representing signal, a receiver in said control means for signals radiated from said workpiece gage device transmitter means, and switching means included in said control means operated by said receiver for modifying said machine tool operating cycle responsive to a radiated signal designating the workpiece dimension being measured.

6. In a machine tool having a tool spindle, a workpiece support, and control means for operating said machine tool by controlling the relative movement of said tool spindle and said workpiece support, the combination comprising an adaptor constructed to be received in said spindle, a bore diameter measuring head carried by said adaptor including triangularly disposed elements with one of said elements and the opposite pair of said elements being mounted for relative movement, means for incrementally extending and retracting said one element to fit different size bores, a pair of limit switches carried by said adaptor spaced from said head, means including a sensing rod for actuating said switches responsive to relative movement of said elements, a radio signal radiating unit carried by said adaptor electrically connected to said switches and operable thereby to radiate a workpiece dimension representing radio signal, and a radio signal receiver included in said control means for receiving a radio signal from said radiating unit designating a workpiece dimension being measured for operating said machine tool responsive to said radio signal.

7. In a machine tool having a tool spindle, a workpiece support, and control means for operating said machine tool by controlling the relative movement of said tool spindle and said workpiece support, the combination comprising an adaptor constructed to be removably received in said spindle, a workpiece measuring head carried by said adaptor, a radio signal radiating unit carried by said adaptor and actuatable by said head to radiate a workpiece dimension representing signal, and a radio signal receiver included in said control means for receiving a radio signal from said radiating unit designating a workpiece dimension being measured for operating said machine tool responsive to said radio signal.

8. In a machine tool having a tool spindle, a workpiece support, and control means for operating said machine tool by controlling the relative movement of said tool spindle and said workpiece support, the combination comprising an adaptor constructed to be removably received in said spindle, a workpiece dimension measuring head, elongated means having a universal connection with said adaptor for supporting said head, a radio signal radiating unit carried by said elongated means and connected therethrough to said head for actuation thereby to radiate a workpiece dimension representing radio signal, and a radio signal receiver included in said control means for receiving a radio signal from said radiating unit designating a workpiece dimension being measured for operating said machine tool responsive to said radio signal.

No references cited.

RICHARD H. EANES, JR., *Primary Examiner.*